UNITED STATES PATENT OFFICE.

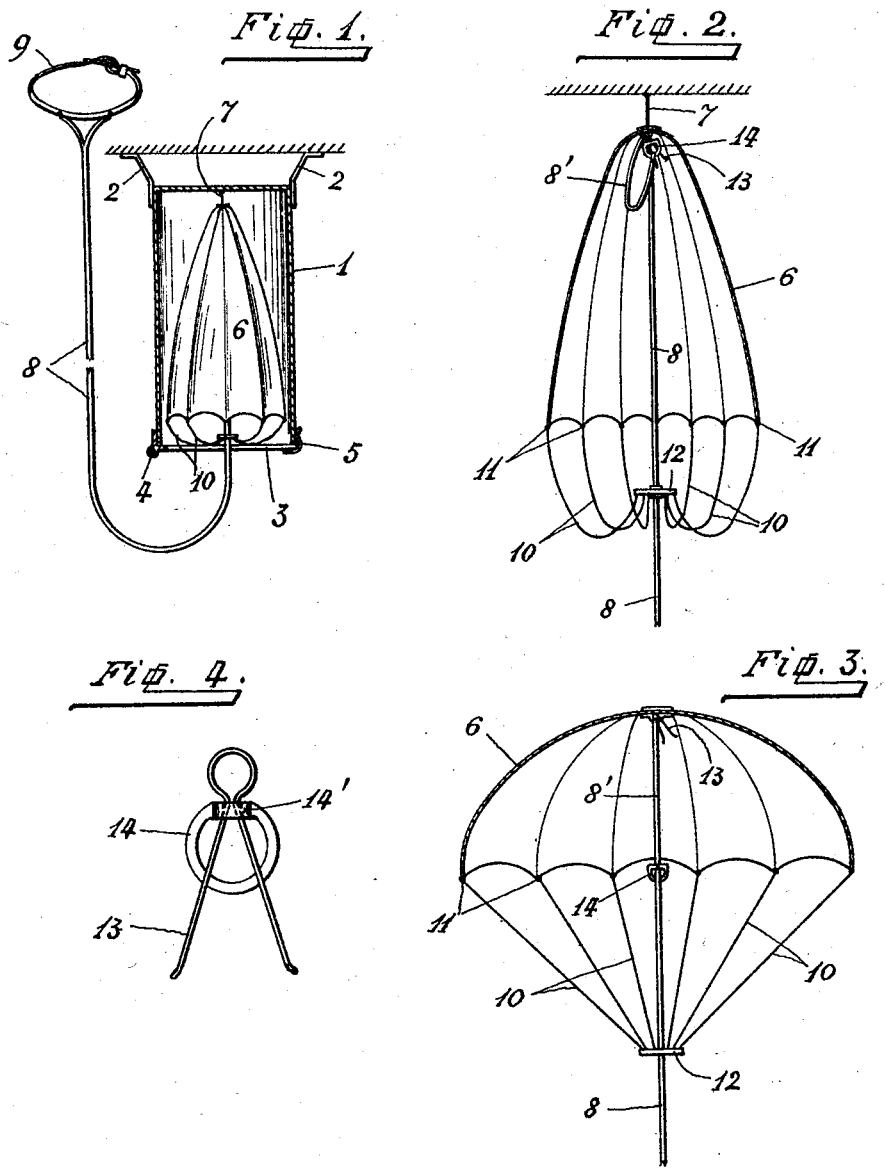

ADELRICH ACKERMANN, OF REIDEN, SWITZERLAND.

PARACHUTE.

1,406,521.  Specification of Letters Patent.  Patented Feb. 14, 1922.

Application filed November 30, 1921. Serial No. 518,907.

*To all whom it may concern:*

Be it known that I, ADELRICH ACKERMANN, a citizen of the Republic of Switzerland, and resident of Reiden, in the Canton of Luzern, Switzerland, have invented certain new and useful Improvements in and Relating to Parachutes, of which the following is a specification.

This invention has reference to parachutes and concerns more particularly a catch-and-release device intended to replace or be used in addition to the snap-cord commonly provided in parachutes and connecting the top or pole thereof with its casing or envelope when in normal, that is, packed position. The object of this catch-and-release device is to eliminate the danger or risk run when employing snap-cords which, either owing to negligence or oversight, might be made too strong or too weak thus refusing to act at the proper time.

In order that my invention may be more clearly understood reference is made to the accompanying drawings, wherein:

Fig. 1 is an elevation, partly in section, showing the mounting of the parachute and its dependent parts;

Fig. 2 shows a sectional elevation, on a larger scale, of the parachute when in packed position or in a position of rest, and Fig. 3 represents the parachute and the catch-and-release device in released or open position, these three views being in diagrammatical form only.

Fig. 4 illustrates details on a larger scale.

In referring to these drawings, 1 designates a cylindrical casing adapted to receive the parachute, this casing at the top being provided with means, such as struts 2, whereby to secure it to a convenient part of the frame of the aircraft to which the parachute is to be applied. The bottom of the casing consists of a slotted member 3 which is hingedly mounted at 4 and ordinarily kept close by the action of a spring arranged at 5, this spring exerting only a slight pressure against the wall of the casing 1 and easily yielding to even a small pressure brought to bear on the member 3 from above. The parachute 6 itself is of the usual design and when in packed position, Figs. 1 and 2, suspended from the top of the casing 1 by a cord 7 just strong enough to carry the parachute and prevent it from becoming accidentally detached. 8 indicates the rope secured to the pole or center of the parachute on the one hand and carrying a belt 9 or the like on the other hand to which the aviator attaches himself. 10 designates the series of radial cords of which one end is connected to the edge of the parachute, as at 11, while the other end of each of the said cords is fixed to a disc 12, the latter also serving to attach to it the rope 8 at a point corresponding with the full span of the parachute, Fig. 3.

Now, the construction and arrangement of the parachute, the casing therefor, and the means for mounting the latter on the aircraft may be of any of the known kind, it not being intended that these features form part of the present invention.

The improved catch-and-release device consists of one or two or more spring-members 13 suspended from the pole or center of the parachute, and a ring 14 having an eyelet 14′, Fig. 4, the said ring being secured to the rope 8 at a point which is approximately half-way between the pole or center and the disc 12. The spring-member 13 and the ring 14 are adapted to be brought into engagement with one another in the manner shown in Figs. 2 and 4, and when so engaged, the parachute is ready for use. The action of the device described is as follows:

Assuming that the aviator desires to make use of the parachute; now, by the weight of the falling aviator the thin cord 7 is caused to snap off, without however, at once causing a release of the ring 14 from the spring-member 13, the gripping power of the latter being greater than the resistance of the cord 7. Nevertheless, a moment later the weight of the freed parachute causes the bottom 3 of the casing 1 to be opened, while the gathered-up top portion or loop 8′ of the rope 8 is almost at the same time stretched thus tearing the ring 14 out of engagement from the spring-member 13, with the result, that the parachute owing to the inrushing air is spanned and takes the form shown in Fig. 3.

It will be observed that the loop or portion 8′ of the rope, when the parts 13 and 14 are engaged, must be short enough that it tends to pull the ring 14 out of its engaged position before the radial cords 10 are under tension, but that the said portion 8′, after the release of the ring 14, is of such length that the draught is taken up by the radial cords only.

Having now fully described my said invention what I claim and desire to secure by Letters Patent is:—

In the herein-described parachute wherein the suspension rope is secured to the inside of the pole of the parachute, the combination, with a casing for the parachute and means for suspending the same from the top of and within the casing, of a catch-and-released device consisting of a spring-member also mounted at the inside of the said pole, and a ring attached to the suspension rope and located at a certain distance below the spring-member, the said ring having an eyelet with which the spring-member is adapted to engage when the parachute is out of use, and being released when a pull is exerted on the suspension rope, all as and for the purpose set forth.

In testimony whereof I have hereunto set my hand in the presence of two subscribing witnesses.

ADELRICH ACKERMANN.

Witnesses:
 EYLANHINE C. WACHS,
 E. GREXS.